(12) United States Patent
Orlin et al.

(10) Patent No.: US 8,817,875 B2
(45) Date of Patent: Aug. 26, 2014

(54) METHODS AND SYSTEMS TO ENCODE AND DECODE SEQUENCES OF IMAGES

(75) Inventors: David J. Orlin, Westminster, MD (US); Kenneth M. Fischer, New Market, MD (US)

(73) Assignee: The Johns Hopkins University, Baltimore, MD (US)

( * ) Notice: Subject to any disclaimer, the term of this patent is extended or adjusted under 35 U.S.C. 154(b) by 828 days.

(21) Appl. No.: 12/540,740

(22) Filed: Aug. 13, 2009

(65) Prior Publication Data

US 2011/0228847 A1  Sep. 22, 2011

(51) Int. Cl.
| H04B 1/66 | (2006.01) |
| H04N 7/26 | (2006.01) |
| H04N 7/36 | (2006.01) |
| H04N 7/50 | (2006.01) |

(52) U.S. Cl.
CPC ........... *H04N 7/50* (2013.01); *H04N 19/00951* (2013.01); *H04N 19/00575* (2013.01); *H04N 7/26271* (2013.01); *H04N 7/26335* (2013.01)
USPC ............. 375/240.12; 375/240.01; 375/240.25

(58) Field of Classification Search
None
See application file for complete search history.

(56) References Cited

U.S. PATENT DOCUMENTS

| 4,604,722 | A | * | 8/1986 | Staplin et al. | ................. | 708/200 |
| 5,230,042 | A | * | 7/1993 | Masaki et al. | ................. | 345/501 |
| 5,650,783 | A | * | 7/1997 | Murashita et al. | ............ | 341/107 |
| 5,954,789 | A | * | 9/1999 | Yu et al. | ......................... | 708/495 |
| 6,411,328 | B1 | * | 6/2002 | Franke et al. | .................. | 348/149 |
| 6,842,124 | B2 | * | 1/2005 | Penna | .............................. | 341/67 |
| 7,995,847 | B2 | * | 8/2011 | Kim et al. | ...................... | 382/232 |
| 8,068,638 | B2 | * | 11/2011 | Malone et al. | ................ | 382/100 |
| 8,078,656 | B1 | * | 12/2011 | Rogers et al. | ................. | 708/200 |
| 8,305,244 | B2 | * | 11/2012 | Said | ................................ | 341/51 |
| 2003/0105788 | A1 | * | 6/2003 | Chatterjee | ..................... | 708/402 |
| 2003/0206582 | A1 | * | 11/2003 | Srinivasan et al. | ....... | 375/240.01 |
| 2006/0055569 | A1 | * | 3/2006 | Tomic | .............................. | 341/50 |
| 2007/0296613 | A1 | * | 12/2007 | Hussain et al. | ................. | 341/50 |
| 2011/0228847 | A1 |  | 9/2011 | Orlin et al. |  |  |

\* cited by examiner

*Primary Examiner* — Hassan Phillips
*Assistant Examiner* — Mark A Mais
(74) *Attorney, Agent, or Firm* — Aisha Ahmad

(57) ABSTRACT

Methods and systems to compress and decompress sequences of images, such as video frames, including compression techniques to estimate pixel values, to determine differences between the estimated pixel values and actual pixel values, to arithmetically encode a corresponding sequence of difference values or symbols as a code value, and to output the code value and associated reference information in a data stream. Decompression techniques include techniques to read the code value and associated reference information from the data stream, to arithmetically decode the symbols from the code value, and to reconstruct the sequence of video frames from the decoded symbols and the associated reference information. Also disclosed are techniques to reduce or preclude overflow of registers or buffers used to hold code range values, and to order tables of code range values to improve efficiency of table look-up operations.

18 Claims, 10 Drawing Sheets

Symbol Sequence AABCDC ↔ 0.1697 ≤ Code < 0.1698

METHODS AND SYSTEMS TO ENCODE AND DECODE SEQUENCES OF IMAGES

STATEMENT OF GOVERNMENTAL INTEREST

This invention was made with U.S. Government support under the U.S. Naval Sea Systems Command, contract number N00024-03-D-6606. The U.S. Government has certain rights in the invention.

BACKGROUND

1. Technical Field

Disclosed herein are methods and systems to compress and decompress sequences of images, such as video frames.

2. Related Art

Imaging systems, such as infrared cameras, hyperspectral imagers, and high-resolution monochrome cameras, may generate relatively large amounts of data. The data may be compressed for storage or for transmission to reduce communication bandwidth requirements.

Compression techniques include relatively lossy techniques, such as a Moving Picture Experts Group (MPEG) format, which may permanently alter and potentially lose some of the data.

Lossless techniques are relatively complex to implement and may not provide a desired level compression and corresponding reduction in communication bandwidth.

SUMMARY

Disclosed herein are methods and systems to compress and decompress sequences of images, such as video frames.

Also disclosed herein are methods and systems to receive a sequence of video frames, to estimate pixel values of the video frames in accordance with one or more models, to determine differences between the estimated pixel values and actual pixel values of the video frames, to encode a corresponding sequence of difference values or symbols as a code value, and to output the code value and associated reference information with similarly formatted data in a data stream.

Also disclosed herein are methods and systems to read the code value and associated reference information from the data stream, to decode the symbols from the code value, and to reconstruct the sequence of video frames from the decoded symbols, the associated reference information, and the one or more models.

Also disclosed herein are methods and systems to arithmetically encode and decode sequences of symbols, such as pixel difference values, including to reduce or preclude overflow of registers or buffers used to hold code range values, and to order tables of code range values, such as to improve efficiency of table look-up operations.

BRIEF DESCRIPTION OF THE DRAWINGS/FIGURES

Figure 1:
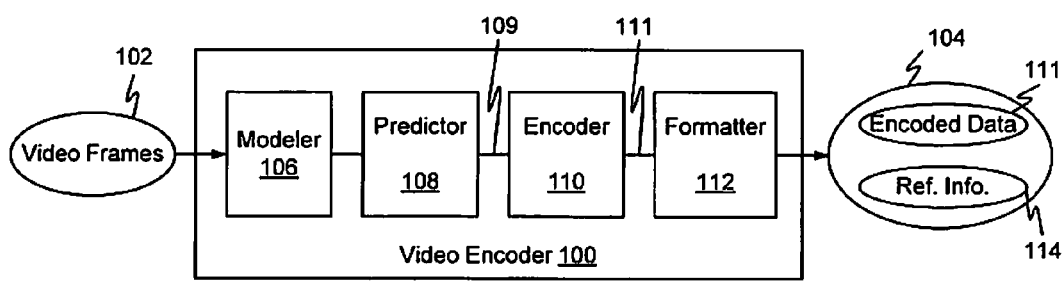
FIG. 1 is a block diagram of an exemplary video encoder to encode a sequence of video frames and to output encoded data.

In the drawings, the leftmost digit(s) of a reference number identifies the drawing in which the reference number first appears.

DETAILED DESCRIPTION

FIG. 1 is a block diagram of an exemplary video encoder 100 to encode a sequence of video frames 102 and to output data 104.

Figure 2:
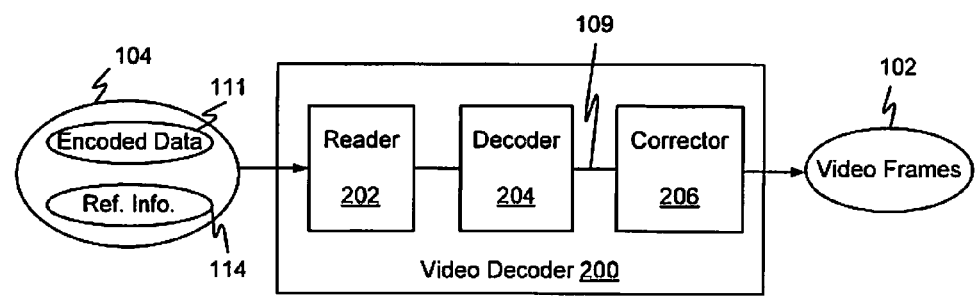
FIG. 2 is a block diagram of an exemplary video decoder to decode the sequence of video frames from the encoded data.

FIG. 2 is a block diagram of an exemplary video decoder 200 to decode the sequence of video frames 102 from data 104.

Video encoder 100 and video decoder 200, may be combined as a video coder/decoder or video CODEC.

Referring to FIG. 1, video encoder 100 may be configured to read the sequence of video frames 102 from a stream of video frames.

Video encoder 100 may include a data modeler 106 to analyze the sequence of video frames 102, and to determine characteristics of the video frames. Modeler 106 may include logic to select, generate, and/or configure one or more models or frameworks to estimate pixel values of the video frames.

For example, and without limitation, modeler 106 may be configured to provide a model to estimate values associated with pixels of a current video frame from pixel values of other video frames. Modeler 106 may be configured to generate a model to estimate a pixel value of current video frame from a corresponding pixel value of one or more reference video frame, which may include one or more video frames of the sequence of video frames 102.

Modeler 106 may be configured to provide a model to estimate a pixel value as an average of pixel values of neighboring pixels.

The sequence of video frames 102 may include multispectral pixel data, and modeler 106 may be configured to generate a model to estimate pixel values for one or more of the spectral bands from pixel values associated with one or more other spectral bands. The model may include an atmospheric absorption model and may include reflection/emission characteristics of a target captured within the sequence video frames 102.

Modeler 106 is not, however, limited to these exemplary models.

Video encoder 100 may include a predictor 108 to estimate pixel values of the video frames within the sequence of video frames 102 in accordance with one or more models provided by modeler 106. Predictor 108 may be further configured to determine a pixel difference value corresponding to a difference between an estimated pixel value and a corresponding pixel value read from the sequence of video frames 102, such as in accordance with equation 1:

$$\epsilon = f(x) - x \quad (1)$$

In equation 1, f(x) represents a predicted value of a sample or pixel generated by and/or in response to a model, x represents corresponding data read from the sequence of video frames 102, and $\epsilon$ represents a corresponding pixel difference value.

Predictor 108 may be configured to output a sequence of difference values $\epsilon$ as a sequence of symbols 109 corresponding to the sequence of video frames 102.

Video encoder 100 may include an encoder 110 to encode sequence of symbols 109 in a compressed format. Encoder 110 may include an arithmetic encoder to encode sequence of symbols 109 as a code value 111, which may include a sequence of bits, which may include or represent a floating-point integer or number of arbitrary precision. Encoder 110 may be configured to arithmetically encode sequence of symbols 109 based on a frequency of occurrence of symbols with the sequence of symbols 109, such that symbols that occur most often are encoded with fewer bits than symbols that occur less frequently. Exemplary arithmetic encoding is described below with respect to FIGS. 3-5.

Video encoder 100 may include a formatter 112 to format code value 111 and corresponding reference information 114 as data 104. Reference information 114 may include information to be used to decode code value 110 and to reconstruct the sequence of video frames 102, such as one or more unencoded reference frames of the sequence of video frames 102.

Formatter 112 may be configured to format and output data 104 as a stream of data, encapsulated to hide details of underlying input/output (I/O) mechanisms. This may permit another application to read and/or write data without knowledge of buffer sizes, caching, flushing, handshaking, and other implementation details.

Formatter 112 may include, for example, a Resource Interchange File Format (RIFF) formatter to format or package bits in a streaming format. Alternatively, or additionally, formatter 112 may be configured to format data 104 to be stored in a computer readable storage device.

Referring to FIG. 2, video decoder 200 may include a reader 202 to read data 104, and may include a RIFF reader to read RIFF formatted bit sequences from a stream of data 104.

Video decoder 200 may include a decoder 204 to decode bits read by reader 202. Where encoder 110 (FIG. 1) includes an arithmetic encoder, decoder 204 may include an arithmetic decoder to decode the sequence of symbols 109 from code value 111. Exemplary arithmetic decoding is disclosed below with reference to FIGS. 6 and 7.

Video decoder 200 may include a corrector 204 to reconstruct the sequence of video frames 102 from decoded symbols 109, reference information 114, and from one or more models implemented by predictor 108. Corrector 204 may be configured to implement equation 2:

$$x = \epsilon + f(x). \quad (2)$$

In equation 2, f(x) represents an output of the one or more models, $\epsilon$ represents a corresponding pixel difference value or symbol from decoded symbols 109, and x represents a corresponding reconstructed pixel or sample value. Where a model determines a difference value relative to reference video frame, f(x) may be generated by the model in response to the corresponding reference pixel value being provided to the model.

Video decoder 200 may be configured to output reconstructed sequence of video frames 102 to a data stream and/or to a storage device.

Encoder 100 and decoder 200 may be implemented to handle one or more of a variety of word sizes, including, without limitation, 8, 16, and/or 32-bit word sizes, and combinations thereof.

A number of potential values of symbols 109 may be defined by a corresponding word size. For example, where symbols 109 are represented with 16-bit words, symbols 109 may have up to 65536 potential values or symbols. Predictor 108 may, however, be configured to generate symbols 109 with substantially fewer symbols. For example, where predictor 108 estimates pixel values as pixel values of a reference video frame, and where the video frames do not differ substantially from frame to frame, pixel difference values or symbols 109 may fall within a relatively small subset of the potential symbol values.

Reference information 114 may include an identification of symbols values encoded within a code value 111, and may include corresponding counts of the numbers of occurrences of the symbols value encoded within the code value 111. Reference information 114 corresponding to a code value 111 may include pairs of values, each pair including a symbol value and a corresponding count.

Arithmetic Encoding

Figure 3:
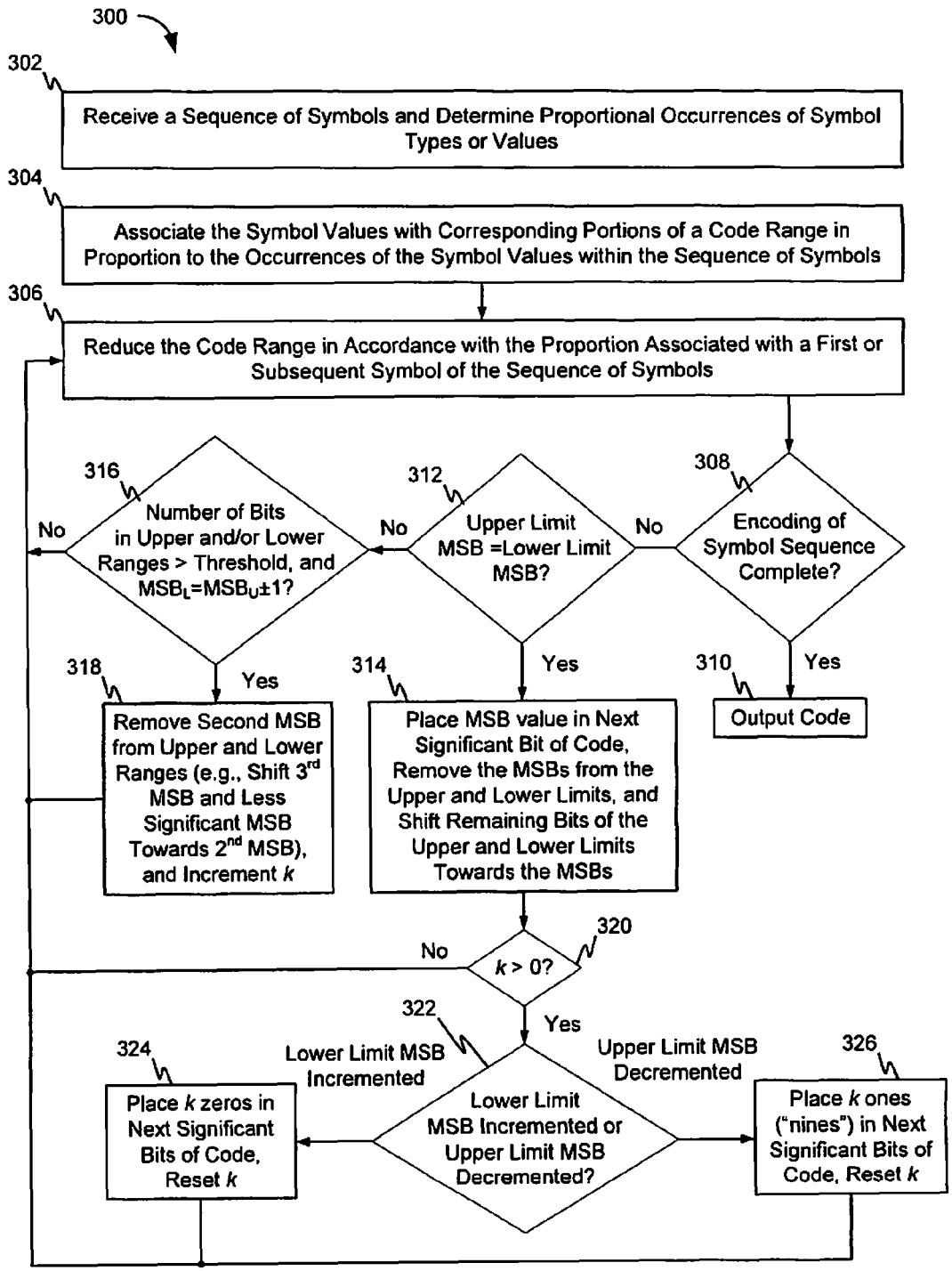
FIG. 3 is a process flowchart of an exemplary method of arithmetic encoding.

FIG. 3 is a process flowchart of an exemplary method 300 of arithmetic encoding. Method 300 is described below with reference to video encoder 100 in FIG. 1. Method 300 is not, however, limited to the example of FIG. 1.

At 302, a sequence of symbols is received. The sequence of symbols may correspond to pixel difference values 109 of FIG. 1.

A number of occurrences of each symbol type or value within the sequence may be determined. For example, and without limitations, the sequence of symbols may include 200 symbols, each having one of four symbol values, A, B, C, and D. The exemplary sequence of 200 symbols may include, for example, 100 A symbols, 40 B symbols, 40 C symbols, and 20 D symbols. In other words, 50% of the symbols have value A, 20% have value B, 20% have value C, and 10% have value D. In other examples, the number of symbols may be less than or greater than 200, the number of difference symbol values may be less than or greater than 4, and the proportional distribution of symbol values may vary.

At 304, the symbol values are assigned corresponding portions of a code range, which may be, for example, from 0.0 to 1.0. The symbol values may be assigned to portions of the code range based on proportions of the symbol values within the sequence of symbols. More frequently occurring symbols may be assigned proportionally larger portions of the code range. The code range may represent an initial range within which a code value is to be determined to uniquely identify the sequence of symbols.

Figure 4:
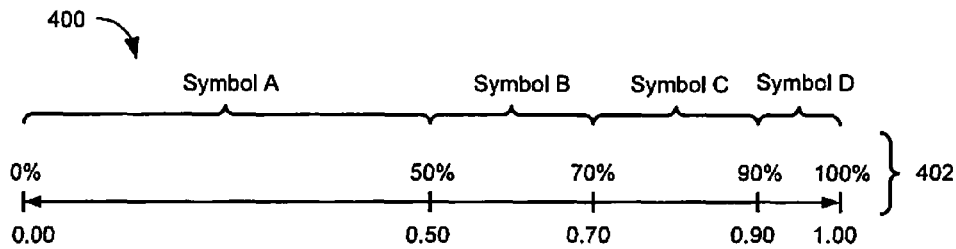
FIG. 4 is a graphic depiction of an exemplary code range and symbols associated with portions of a code range.

FIG. 4 is a graphic depiction of an exemplary code range 400, wherein symbol values A, B, C, and D are associated with the following ranges in accordance with the exemplary proportions above:

$0.0 \leq A < 0.5$ (50%);

0.5≤B<0.7 (20%);
0.7≤C<0.9 (20%); and
0.9≤D<1.0 (10%).

In the example above, each symbol range portion extends up to but does not include the boundary with the next symbol range portion. Thus, symbol D extends up to 0.9999 . . . , which may be treated as mathematically equivalent to 1.0.

At 306, the code range is narrowed to a code range portion associated with a first symbol within the sequence of symbols. An exemplary sequence of symbols may include AAB-CDC, wherein symbol A is taken as the first symbol.

Figure 5:
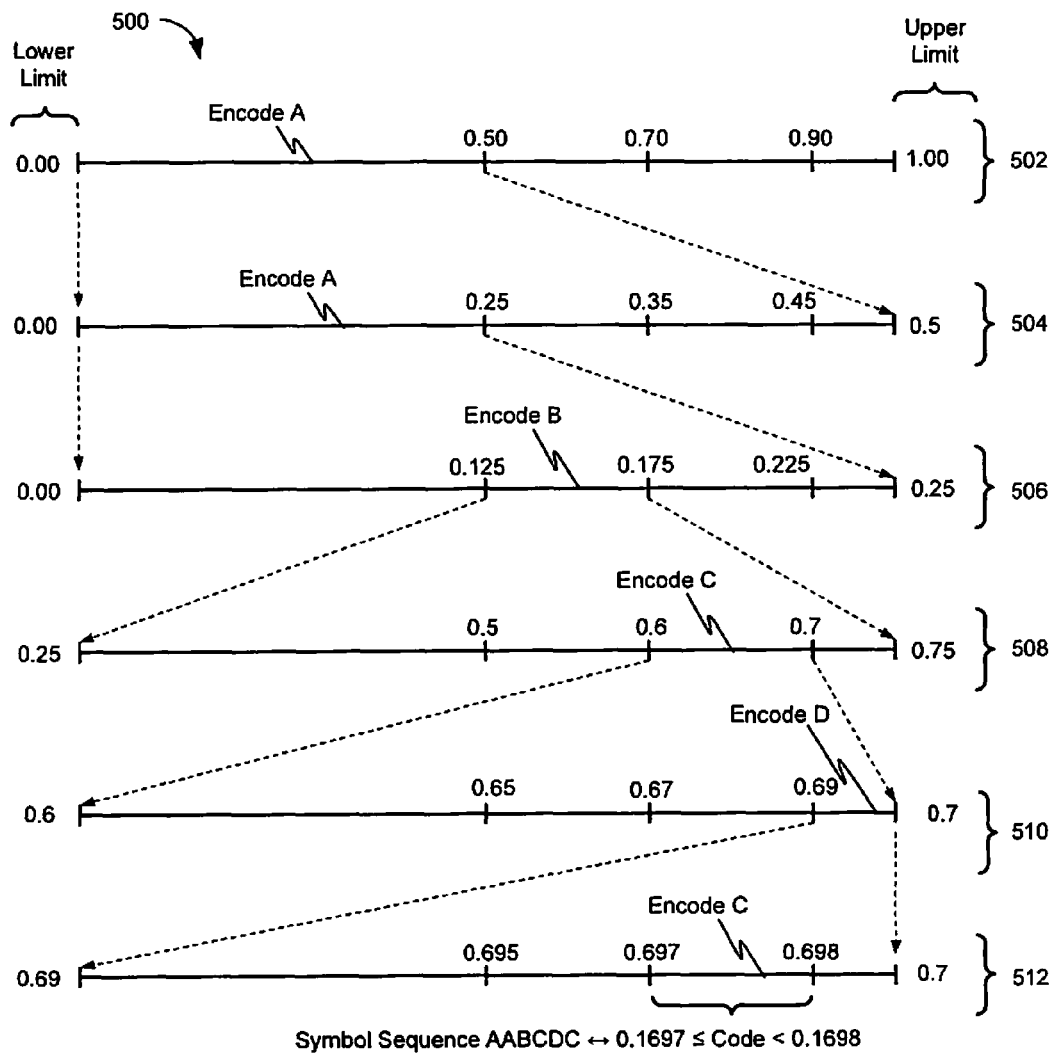
FIG. 5 is an exemplary graphic depiction of arithmetic encoding of a sequence of symbol.

FIG. 5 is an exemplary graphic depiction 500 of arithmetic encoding of symbol sequence AABCDC, including iteratively refined code ranges 502, 504, 506, 508, 510, and 512, each corresponding to an encoding of a symbol within the sequence AABCDC.

Initial code range 502 is narrowed to code range 504 in response to first symbol A, such that:
0.0≤current code range<0.5.

Symbol values A, B, C, and D, may be assigned to current code range 504 range as follows:
0.0≤A<0.25 (50%);
0.25≤B<0.35 (20%);
0.35≤C<0.45 (20%); and
0.45≤D<0.5 (10%).

Returning to FIG. 3, the current code range may be iteratively narrowed at 306 with each subsequent symbol as illustrated in Table 1:

TABLE 1

| Iteration | Symbol | Resultant Current Code Range | |
| --- | --- | --- | --- |
| | | Lower Limit (≤) | Upper Limit (<) |
| | | 0.0 | 1.0 |
| 1 | A | 0.0 | 0.5 |
| 2 | A | 0.0 | 0.25 |
| 3 | B | 0.125 | 0.175 |
| 4 | C | 0.16 | 0.17 |
| 5 | D | 0.169 | 0.17 |
| 6 | C | 0.697 | 0.698 |

At 308, upon encoding of the last symbol of the sequence of symbols, a code value corresponding to the sequence of symbols is output at 310. In the example of FIG. 5, the code value may be output as any number that satisfies: 0.697≤code value<0.698. An end of sequence marker may be inserted or added to the output code value.

The output code value may represent a compressed form of the sequence of symbols.

One or more techniques may be implemented to improve efficiency and/or to reduce or preclude overflow of registers or buffers used to hold values associated with the code range. Exemplary techniques are disclosed below.

In FIG. 1, encoder 110 may include integer arithmetic logic, which may include shift registers, such as, for example, 32 bit shift registers. In hexadecimal notation, lower and upper limits of a code range value may be initialized at 00000000 and FFFFFFFF, respectively. The least significant bit of the upper limit may be initialized at 1 to represent an essentially infinite sequence of 0.9999.

Method 300 may include removing and outputting bits or digits of the code value during encoding, which may free up buffer or register space, and which may reduce processing requirements.

For example, at 312, when the most significant bit (MSB) of the upper and lower limits of a code range achieve a common value, the value may be output at 314 as the next significant bit of output code at 310, the corresponding MSBs may be removed from the upper and lower limits of the code range, and the remaining bits shifted towards the MSB position. This is possible because the common MSB value in the lower and upper ranges will not change in subsequent narrowings of the code range.

Outputting of a common MSB value is illustrated in FIG. 5 in a transition from current code range 506 to current code range 508, where symbol B narrows current code range 506 to:
0.125≤current code range<0.175.

In this example, the lower limit and upper limit MSBs are 1, and may thus be removed from the lower and upper limits and output as the next significant bit of the code value at 314. Accordingly, current code range 508 is illustrated in FIG. 5 as:
0.25≤current code range<0.75.

Similarly, current code range 512 is narrowed by symbol C to:
0.697≤current code range<0.698.

In this example, where the sequence of symbols to be encoded included additional symbols, the two MSB values of 0.69 may be removed from the lower and upper limits and output as the next significant bits of the output code at 314, and the current code range would be:
0.7≤current code range<0.8.

Method 300 may include a method of handling an underflow condition, where a number of digits of a range value may exceed the capacity of a register or buffer. An underflow condition may arise where the current code range straddles a digit, such as 0.5999 to 0.6001. In this example, the leading digits, 5 and 6, may not converge to a common digit until too many digits are appended.

An underflow condition may be detected at 316. Detection of an underflow condition may include detecting that the MSBs of the lower and upper ranges differ by 1, and that the number of digits in the lower and/or upper current code range exceeds a threshold.

At 318, the second most significant bit (SMSB) may be removed from the lower and upper ranges, and a counter k may be incremented.

After one or more subsequent narrowings of the current code range at 306, and when the MSBs of the lower and upper ranges are equal at 312, the MSB value is output at 314 as described above.

At 320, the counter value k is examined. When the counter value k is greater than zero, indicating that one or more SMSBs have been removed from the code ranges in accordance with 316, a determination is made at 322 as to whether the lower limit MSB was incremented to the current MSB value at 306, or the upper limit MSB was decremented to the current MSB value at 306.

Where the lower limit MSB was incremented to the current MSB value at 306, k zeros are placed in the next significant bits of the output code at 324, and the counter is reset. The k zeros represent the corresponding k SMSBs removed from the lower range as described with respect to 318.

Where the upper limit MSB was decremented to the current MSB value at 306, k "nines," or binary equivalents thereof, are placed in the next significant bits of the output code at 324, and the counter is reset. The k nines represent the corresponding k SMSBs removed from the upper range as described at 318.

Arithmetic Decoding

Decoding may include reversing a corresponding encoding process, such as reversing method 300, or portions thereof.

Figure 6:
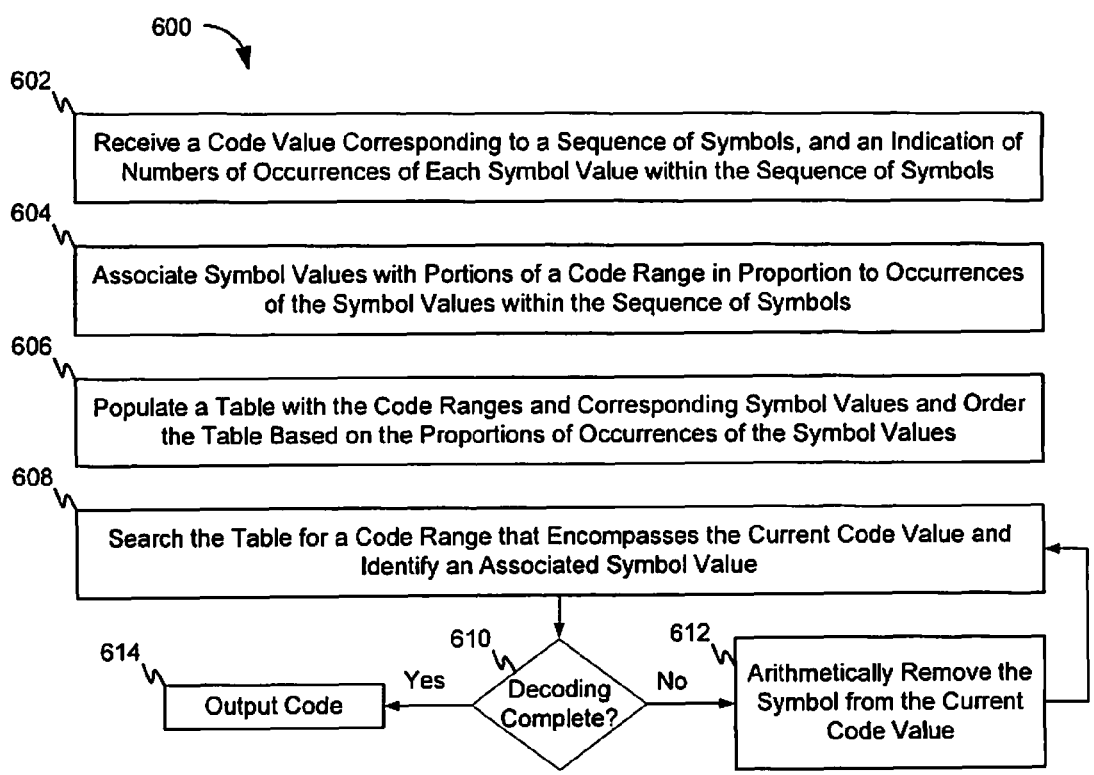
FIG. 6 is a process flowchart of an exemplary method of arithmetic decoding, including sorting one or more tables of code range values.

FIG. 6 is a process flowchart of an exemplary method 600 of arithmetic decoding, including sorting one or more tables. Method 600 is described below with reference to video decoder 200 in FIG. 2. Method 600 is not, however, limited to the example of FIG. 2.

At 602, a code value is received corresponding to a sequence of encoded symbols, such as code value 111 in FIG. 1. The code value may include a floating-point value and may include a floating point integer value. An indication of symbol types and corresponding numbers of occurrences encoded within the code value may also be received, such as within reference information 114 in FIG. 2.

Continuing with the example above, the received code value may be 0.1697, and the proportional symbol count may be as illustrated in Table 2.

TABLE 2

| A | B | C | D |
|---|---|---|---|
| 100 (50%) | 40 (20%) | 40 (20%) | 20 (10%) |

At 604, the symbol values are associated with portion of a code range in proportion to occurrences of the symbol values in the corresponding sequence of symbols, such as described above with respect to FIG. 4.

At 606, one or more tables may be populated with the code ranges and associated symbol values. The one or more tables may be sorted based on the proportions of the occurrences of the symbol values.

For example, where the code value includes a floating-point number, and where portions of the code range associated with symbols differ from one another, it may not be feasible to use the floating-point code value as an array index. In other words, it may not be feasible to directly associate a code value with a symbol. Rather, a search may be performed to find a code range in the table that encompasses the code value, and to identify a corresponding symbol associated with the identified code range.

The table may be sorted in accordance with proportional occurrences of the symbol values in a corresponding sequence of symbols, such that symbol values that occur most often in the symbol sequence are encountered relatively early in the search. The table may be regenerated and sorted for each new code value. Such table sorting may reduce decoding time.

Table sorting may also be implemented with respect to encoding.

At 608, a code range that corresponds to the code value is identified, and a symbol associated with the code range is identified as a first symbol of the sequence of symbols. In the example of FIG. 4, code value 0.1697 falls within the range of symbol A. Symbol value A may thus be output as the first symbol of the sequence of symbols.

At 610, a determination is made as to whether all of the encoded symbols have been decoded. This may include determining if the most recently decoded symbol is an end of sequence marker.

At 612, the symbol identified at 608 is arithmetically removed from the code value. For example, code value 0.1697 may be divided by the range of symbol A to remove symbol A from the code value, resulting in a current code value of 0.3394.

Decoding at 608 and arithmetic removal of the code value at 612 may be repeated until all of the symbols of the sequence of symbols are decoded.

For example, at 608, current code value 0.3394 falls also within the range of symbol A in FIG. 4. Symbol value A may thus be output as the second symbol of the sequence of symbols.

At 612, current code value of 0.3394 may be divided by the range of symbol A, resulting in a current code value of 0.6788.

At 608, current code value 0.6788 falls within the range of symbol B in FIG. 4.

This may continue until an end of sequence marker is encountered.

Figure 7:
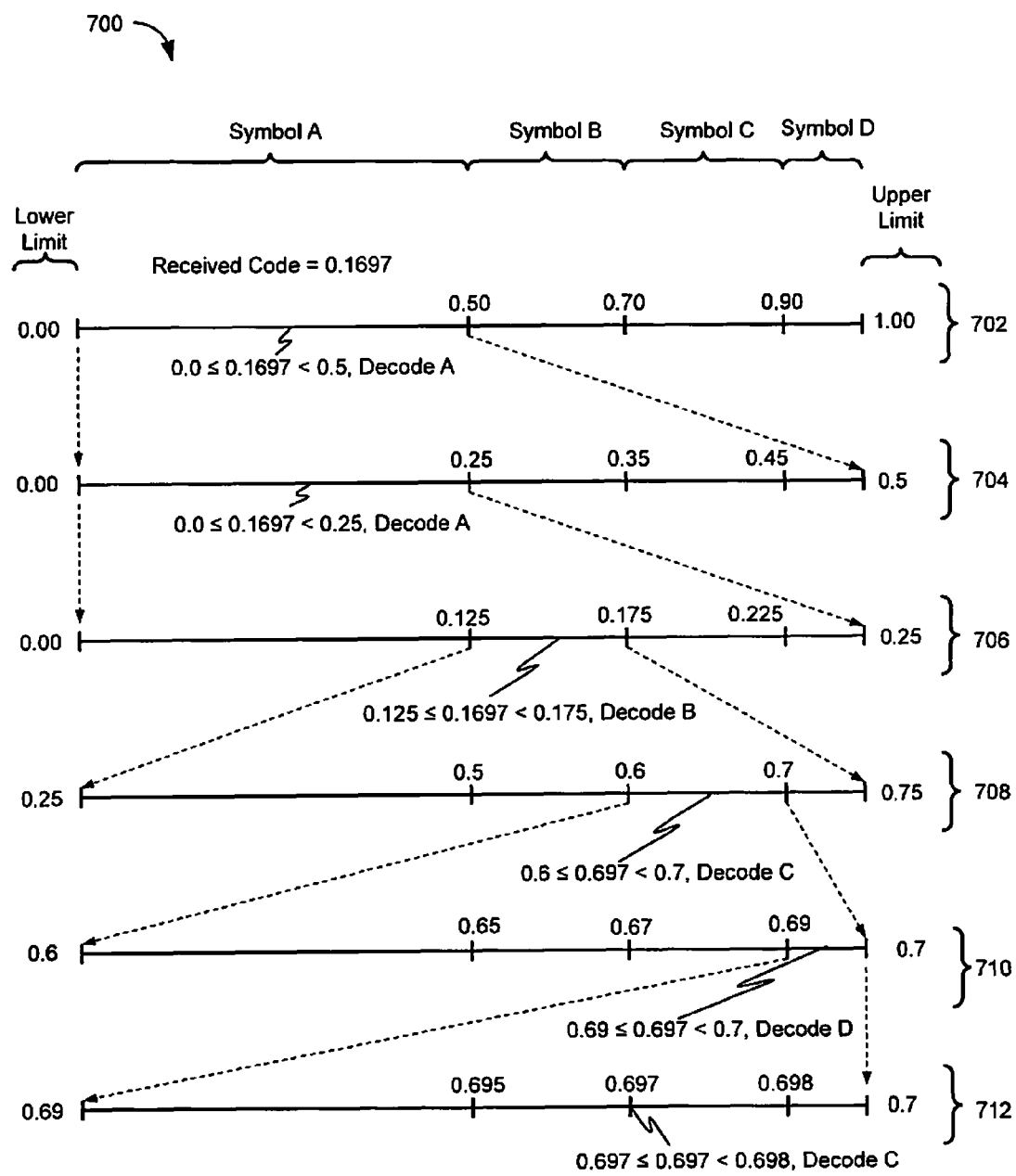
FIG. 7 is an exemplary graphic depiction arithmetic decoding of a code value.

FIG. 7 is an exemplary graphic depiction of arithmetic decoding of a sequence of symbols from a code value 0.1697, as illustrated by code ranges 702, 704, 706, 708, 710, and 712. In the example of FIG. 7 symbol values A, B, C, and D are associated with the following ranges in accordance with the proportions of Table 2:

0.0≤A<0.5 (50%);
0.5≤B<0.7 (20%);
0.7≤C<0.9 (20%); and
0.9≤D<1.0 (10%).

In code range 702, code value 0.1697 falls within the range of symbol A, 0.0≤A<0.5. Symbol A may thus be output as the first symbol of the sequence of symbols.

The symbol values may be reassigned corresponding portions of the range of symbol A, as illustrated by current code value 704, where code value 0.1697 again falls with the range of symbol A, 0.0≤A<0.25. Symbol A may thus be output as the second symbol of the sequence of symbols.

The symbol values may be reassigned corresponding portions of the range of symbol A, as illustrated by current code value 706, where code value 0.1697 falls with the range of symbol B, 0.125≤B<0.175. Symbol B may thus be output as the third symbol of the sequence of symbols.

Since the MSB of the lower and upper ranges are equal to one another, the MSBs may be omitted from further computations and/or table look-ups, as described above, and the remaining bits may be shifted towards the MSB positions.

The symbol values may be reassigned corresponding portions of the range of symbol B, as illustrated by current code value 708, where code value 0.1697 falls with the range of symbol C, 0.6≤C<0.7. Symbol C may thus be output as the fourth symbol of the sequence of symbols.

The symbol values may be reassigned corresponding portions of the range of symbol C, as illustrated by current code value 710, where code value 0.1697 falls with the range of symbol D, 0.69≤D<0.70. Symbol D may thus be output as the fifth symbol of the sequence of symbols.

The symbol values may be reassigned corresponding portions of the range of symbol D, as illustrated by current code value 712, where code value 0.1697 falls with the range of symbol C, 0.697≤C<0.698. Symbol C may thus be output as the sixth symbol of the sequence of symbols.

Byte-Based Models

Referring to FIG. 1, modeler 106 and/or predictor 108 may include one or more byte-based models to determine pixel difference values for different bytes of an image or video frame.

For example, predictor 108 may be configured to represent a pixel value as a signed integer using a plurality of bytes, such as, for example, two bytes.

Where predictor 108 is configured to determine pixel difference values relative to a reference image, such as described above, and where video frames within the sequence of video frames 102 are relatively consistent between adjacent video frames, the pixel difference values may tend to have relative small positive and negative values. Such a situation may arise, for example, with respect images generated by an infrared imaging system, such as, for example, a PC320 infrared camera developed by Electrophysics Corporation.

Where the pixel difference values tend to be relatively small positive and negative values, the low byte, or less significant byte, may tend to have a relatively wide range of values over the sequence of video frames 102, while the high byte, or more significant byte may tend to have values of predominantly all zeros for positive difference values, and predominantly all ones for negative difference values. Where the bytes are 8-bits each, the high byte may tend to be one of 0 and 255, depending upon whether a corresponding pixel value increased or decreased relative to a corresponding reference pixel.

Tables 3 and 4 illustrate exemplary an exemplary 3×3 pixel portion of respective first and second consecutive images or video frames. Table 5 illustrates an exemplary corresponding difference image. Table 6 illustrates an exemplary corresponding two-byte, binary format, of the difference image of Table 5.

TABLE 4

Image 2

| 7045 | 7017 | 6993 |
|------|------|------|
| 7474 | 7009 | 7009 |
| 6996 | 6994 | 6992 |

TABLE 3

Image 1

| 7050 | 7012 | 6990 |
|------|------|------|
| 7477 | 7001 | 7016 |
| 6996 | 6994 | 6999 |

TABLE 5

Difference Image

| 5 | −5 | −3 |
|---|----|----|
| 3 | −8 | 7  |
| 0 | 0  | −2 |

TABLE 6

| High | Low | High | Low | High | Low |
|------|-----|------|-----|------|-----|
| 00000000 | 00000101 | 11111111 | 11111011 | 11111111 | 11111101 |
| 00000000 | 00000011 | 11111111 | 11111000 | 00000000 | 00000111 |
| 00000000 | 00000000 | 00000000 | 00000000 | 11111111 | 11111110 |

Figure 8:
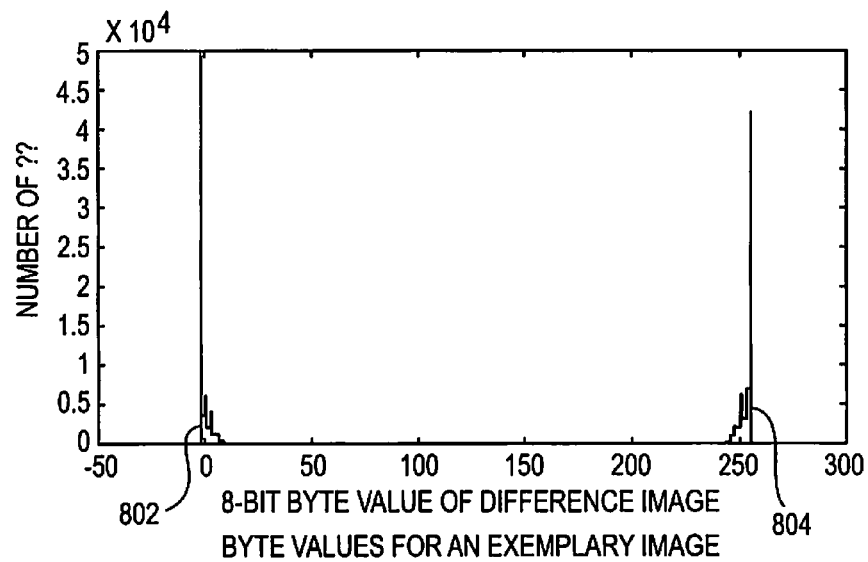
FIG. 8 is a graphic depiction of an exemplary distribution of pixel values corresponding to multi-byte pixel values, wherein low byte values and high byte values are illustrated together.

FIG. 8 is a graphic depiction of an exemplary distribution of pixel values when high and low bytes are considered together. In the example of FIG. 8, a probability of a 0 at 802 is approximately 33% and a probability of a 255 at 804 is approximately 28%.

Figure 9:
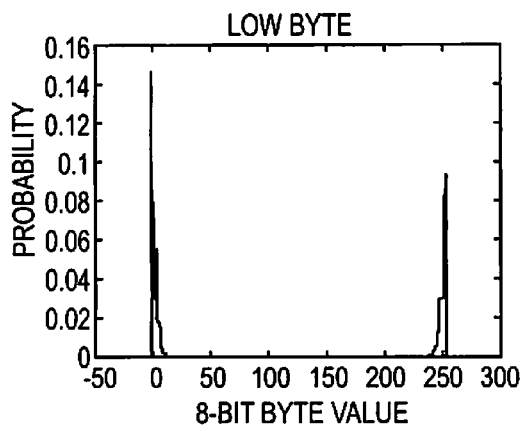
FIG. 9 is a graphic depiction of an exemplary distribution of low byte pixel values corresponding to multi-byte pixel values.
Figure 10:
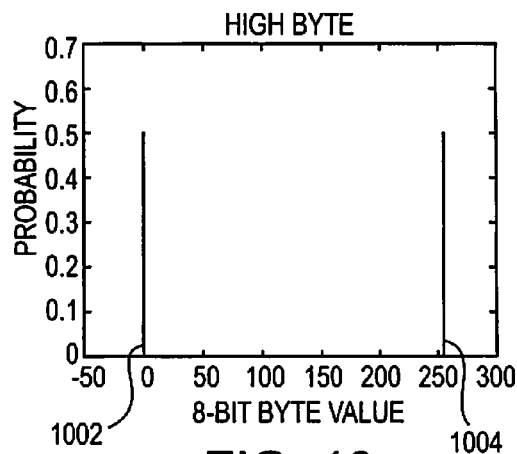
FIG. 10 is a graphic depiction of an exemplary distribution of high byte pixel values corresponding to multi-byte pixel values.

FIGS. 9 and 10 are graphic depictions of exemplary distributions of pixel values when low bytes (FIG. 9) and high bytes (FIG. 10) are considered separately. In the example of FIG. 10, a probability of 0, at 1002, or a 255, at 1004, within a high byte is approximately 50% for each. The increased probability of occurrence may be utilized to improve compression.

For example, in FIG. 1, predictor 108 may be configured to predict high byte values and low byte values using corresponding byte-based models, and to generate corresponding high byte difference values and low byte difference values.

Where encoder 110 includes an arithmetic encoder, and/or where decoder 204 includes an arithmetic decoder, the corresponding arithmetic encoder and/or decoder may be configured to apportion high byte difference values amongst a code range based on proportions of symbols that appear in a sequence of high-byte difference values, and to apportion low byte difference values amongst a code range based on proportions of difference symbols that appear in a sequence of low-byte difference values.

One or more of predictor 108, encoder 110, and decoder 204 may be configured to alternate between high-byte and low-byte processing.

Where multiple byte words are implemented, corresponding byte based models may improve accuracy in predicting the byte values, and may provide improved compression performance.

Formatting

Referring to FIG. 1, formatter 112 may be configured to encapsulate encoded video frame data in one or more of a variety of message structures formats.

A message structure may be configured to encapsulate and add information associated with a sequence of video frames in a structured manner to an output data stream.

Figure 11:
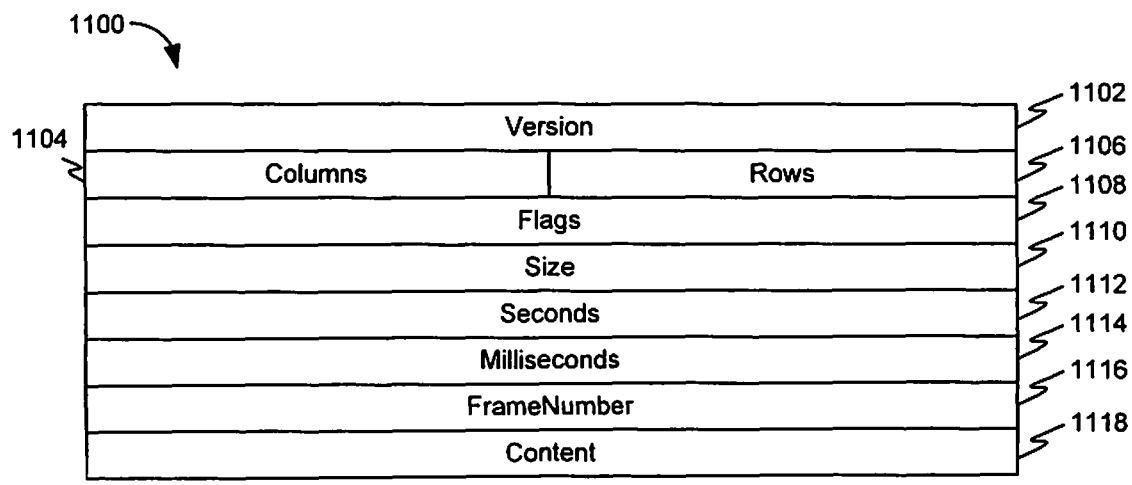
FIG. 11 is a graphic depiction of an exemplary message structure.
Figure 12:
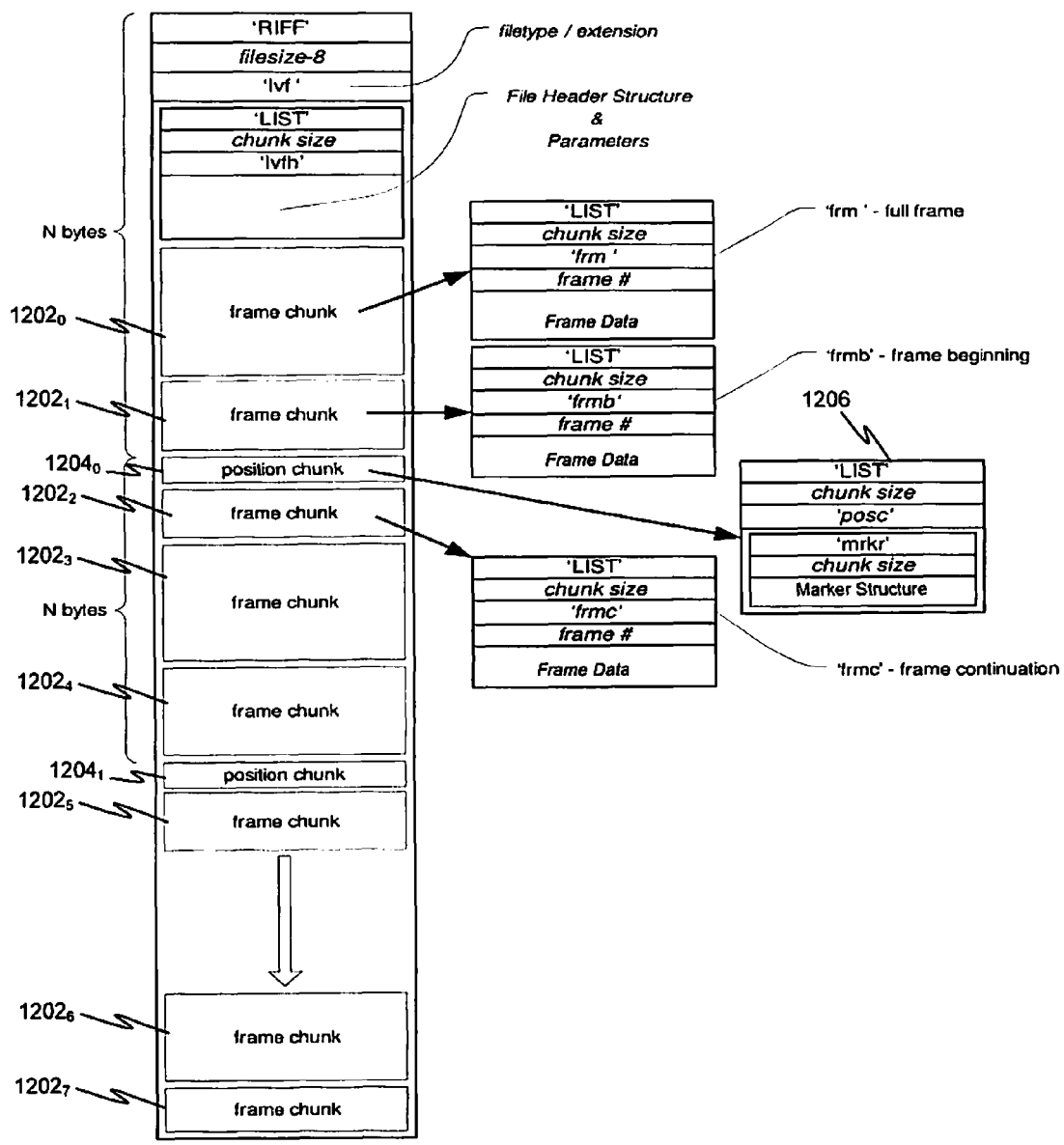
FIG. 12 is a graphic depiction of another exemplary message structure.

FIGS. 11 and 12 are graphic depictions of exemplary message structures 1100 and 1200, respectively. One or more features disclosed below with respect to FIGS. 11 and 12 may be implemented alone and or in various combinations with one another.

In FIG. 11, message structure 1100 may include a version field 1102, to specify a version number of the message format. Version field 1102 may be configured for a 32-bit unsigned integer, for example. Version field 1102 may be utilized where multiple versions of message format 1100 may be encountered.

Message structure 1100 may include a column field 1104 and a row field 1106 to specify vertical and horizontal dimensions, respectively, of a corresponding image. Column field 1104 and row column 1106 may each be configured for 16-bit unsigned integers.

Message structure 1100 may include a flag field 1108 to provide parameters to control decoding of a sequence of video frames. Flag field 1108 may include a bitwise OR of multiple parameters. Flag field 1108 may be configured for a 32-bit unsigned integer.

A bit of flag field 1108 may be used to indicate whether a corresponding video frame is a key or reference frame. For example, reference information 114 may include uncompressed reference video frames, which may be used by video decoder 200 to decode encoded data 111. One or more video frames of an otherwise encoded sequence of video frames may be used as reference video frames. A reference video frame may include a first video frame and/or one or more subsequent video frames the sequence of video frames 102. A reference video frame may be repeated periodically, such as to preclude errors from propagating through decoder 200.

A bit of flag field 1108 may be used to indicate whether a size of a corresponding video frame differs from that of a previous video frame, which may be in one or more of a row or column dimension. Such a bit may imply that the video frame is a reference video frame.

Message structure 1100 may include a content portion 1118 to hold content associated with a corresponding video frame. A part of content portion 1118 may include normalized, scaled symbol counts associated with a corresponding video frame. The part of content portion 1118 may be, for example, 256 bytes. Another part of content portion 1118 may include an end-of-sequence marker.

Message structure 1100 may include a size field 1110 to specify a length of content portion 1118. Size field 1110 may be configured for a 32-bit unsigned integer, for example, to specify the length of content portion 1118 in 8-bytes, for example.

Message structure 1100 may include one or more of a seconds field 1112 and a milliseconds field 1114 to specify a time associated with a corresponding video frame. The time may represent a time of day that an image corresponding to the video frame was recorded. Time may be assigned and/or determined in accordance with equation 3:

$$\text{Time In Seconds} = \text{Seconds} + \frac{\text{Milliseconds}}{1000}. \quad (3)$$

One or more of seconds field 1112 and milliseconds field 1114 may be configured for 32-bit unsigned integers.

Message structure 1100 may include a frame number field 1116 to associate a reference number to a corresponding frame. A reference number may be assigned by a corresponding imaging system or camera. Frame number field 1116 may be configured for a 32-bit unsigned integer.

To reduce decoding time, a sub-set of video frames may be omitted from processing. For example, and without limitation, one of every three frames may be omitted from processing.

Multi-byte words may be stored in a little endian format.

In FIG. 12, message structure 1200 may correspond to a Resource Interchange File Format (RIFF).

Message structure 1200 may include a plurality of frame chunks 1202 to receive corresponding video frame data.

Message structure 1200 may include position chunks 1204 to mark times and/or positions within a sequence of video frames. Position chunks 1204 may be used to permit an application to advance and/or rewind through the data stream. Position chunks 1204 may be written at fixed byte intervals.

Position chunks 1204 may include corresponding marker structures. In the example of FIG. 12, position chunk $1204_0$ includes a marker structure 1206, which may include one or more of, byte offsets to a previous frame chunk $1202_1$, byte offsets to a next frame chunk $1202_2$, a video frame number corresponding to a next video frame, and other information.

A frame chunk may include or be separated into a beginning frame chunk $1202_1$ and a continuation frame chunk $1210_2$, such as to accommodate a position chunk $1204_0$.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 13:
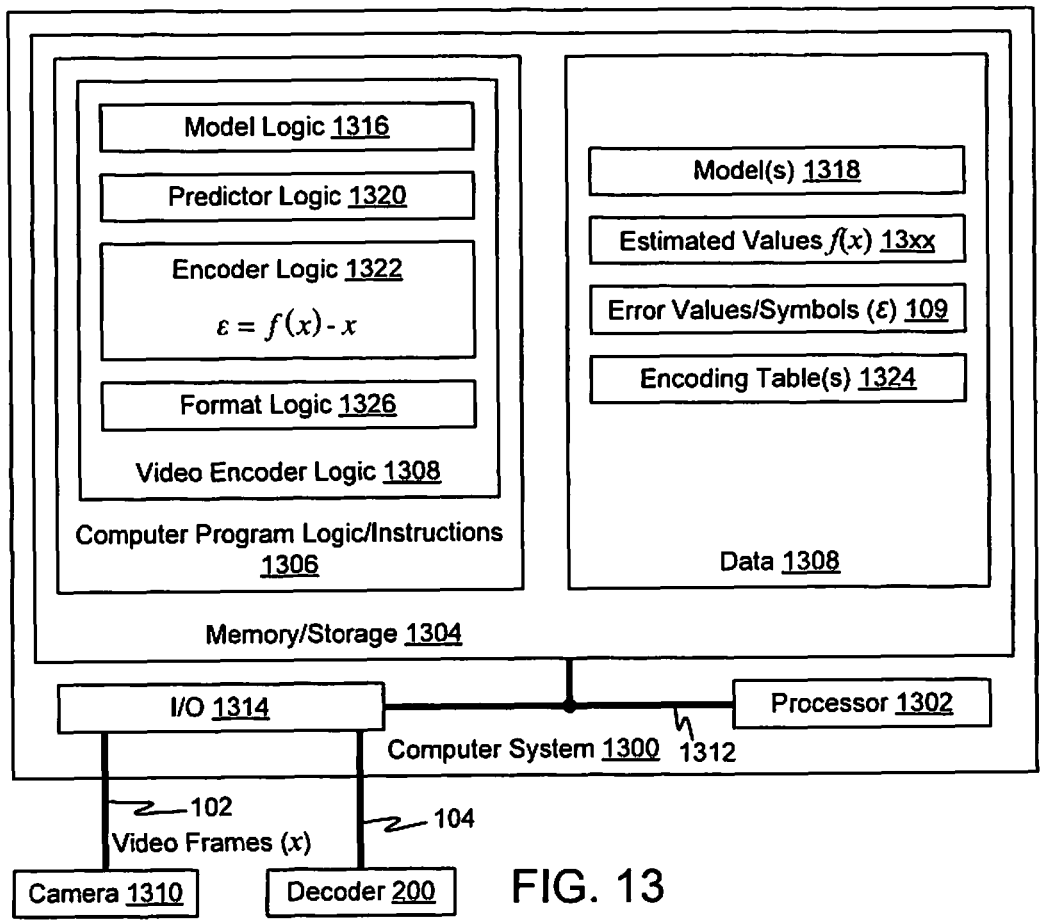
FIG. 13 is a block diagram of an exemplary computer system to encode a sequence of video frames as a code value.

FIG. 13 is a block diagram of an exemplary computer system 1300 to encode the sequence of video frames 102 and to output data 104.

Computer system 1300 may include one or more computer instruction processing units, illustrated here as a processor 1302, to execute computer program product logic, also known as instructions, code, and software.

Computer system 1300 includes memory/storage 1304, including a computer readable medium having computer program product logic or instructions 1306 stored thereon, to cause processor 1302 to perform one or more functions in response thereto.

Memory/storage 1304 further includes data 1308 to be used by processor 1302 in executing instructions 1306, and/or generated by processor 1302 in response to execution of instructions 1306.

In the example of FIG. 13, logic 1306 includes video encoder logic 1308 to cause processor 1302 to encode a sequence of video frames 102, which may be received from an imaging device or camera 1310. Video encoder logic 1308 may include logic to cause processor 1302 to output data 104 to decoder 200, such as described in one or more examples herein.

Computer system 1300 may include a communications infrastructure 1312 to communicate amongst components of computer system 1300.

Computer system 1300 may include an input/output controller 1314 to communicate with one or more of camera 1310 and decoder 200.

Video encoder logic 1308 may include model logic 1316 to cause processor 1302 to analyze the sequence of video frames 102, and to determine characteristics of the video frames, such as described in one or more examples herein.

Video encoder logic 1308 may include predictor logic 1320 to cause processor 1302 to estimate contents of the video frames within the sequence of video frames 102, in accordance with one or more models 1318, and to determine difference values or symbols 109 between estimated values and values read from the sequence of video frames 102, such as described in one or more examples herein.

Video encoder logic 1308 may include encoder logic 1322 to cause processor 1302 to encode difference values 109 as a code value 111, such as described in one or more examples herein.

Encoder logic 1322 may include arithmetic encoder logic, which may include underflow condition logic, to cause processor 1302 to handle underflow conditions, such as described in one or more examples herein.

Encoder logic 1322 may include table logic to cause processor 1302 to order and look-up code range values in one or more encoding tables 1324.

Video encoder logic 1308 may include formatter logic 1326 to cause processor 1302 to format and output data 104 in data stream, such as described in one or more examples herein.

Figure 14:
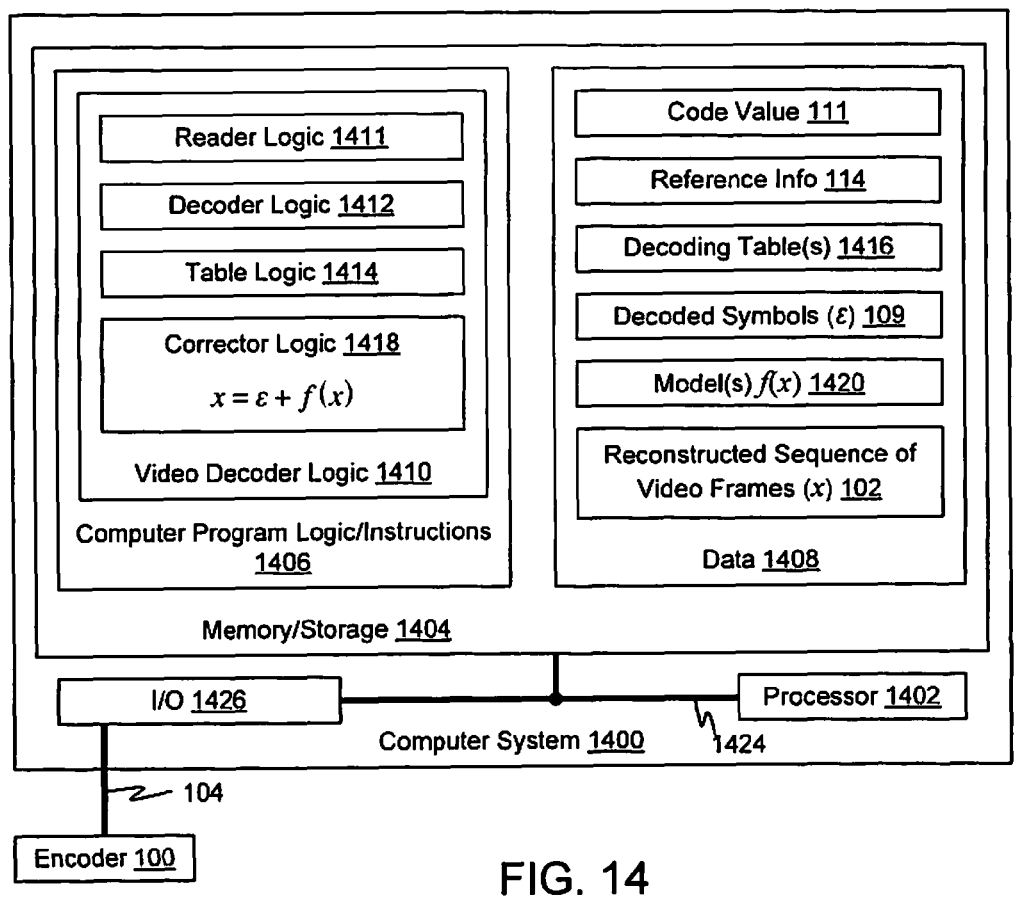
FIG. 14 is a block diagram of an exemplary computer system to decode the code value and to reconstruct the sequence of video frames.

FIG. 14 is a block diagram of an exemplary computer system 1400 to decode the sequence of symbols 102 from data 104.

Computer system 1400 may include one or more computer instruction processing units, illustrated here as a processor 1402, to execute computer program product logic.

Computer system 1400 includes memory/storage 1404, including a computer readable medium having computer program product logic or instructions 1406 stored thereon, to cause processor 1402 to perform one or more functions in response thereto.

Memory/storage 1404 further includes data 1408 to be used by processor 1402 in executing instructions 1406, and/or generated by processor 1402 in response to execution of instructions 1406.

Logic 1406 may include video decoder logic 1410 to decode the sequence of video frames 102 from a code value 111 and associated reference information 114.

Video decoder logic 1410 may include reader logic 1411 to cause processor 1402 to read data 104, including encoded data 111 and reference information 114, such as described in one or more examples herein.

Video decoder logic 1410 may include decoder logic 1412 to cause processor 1402 to decode the sequence of symbols 109 from code value 111, with reference to reference information 114, such as described in one or more examples herein.

Video decoder logic 1410 may include table logic 1414 to cause processor 1402 to order and look-up code ranges within one or more decoding tables 1416 in accordance with proportional occurrences of symbols in the sequence of symbols 102, such as described in one or more examples herein. The proportions of occurrences may be provided within reference information 114.

Video decoder logic 1410 may include corrector logic 1418 to cause processor 1402 to reconstruct the sequence of video frames 102 from decoded symbols 109 and reference information 114 in accordance with one or more models 1420, such as described in one or more examples herein. The one or more models 1420 may correspond to the one or more models 1318 of FIG. 13. The one or more models 1420 may include one or more byte-based models, such as described in one or more examples herein.

Computer system 1400 may include a communications infrastructure 1424 to communicate amongst components of computer system 1400.

Computer system 1400 may include an input/output controller 1426 to communicate with encoder 100.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A system, comprising:
   a module to receive pixel values associated with a sequence of video frames;
   a prediction module to estimate pixel values of at least a portion of the video frames in accordance with one or more models, and to generate a sequence of symbols corresponding to differences between the estimated pixel values and corresponding received pixel values;
   a module to arithmetically encode a sequence of symbols as a floating point integer code value, including to associate the symbols with portions of a code range such that each respective one of the symbols is assigned a corresponding consecutive portion of the code range in proportion to a frequency of occurrence of each respective one of the symbols within the sequence of symbols, and to iteratively refine the code range in accordance with the proportions associated with the symbols to define an output code value representing a compressed form of the sequence of symbols;
   an underflow module to reduce a number of digits in one or more of a lower limit and an upper limit of the code range when the most significant digits of the lower limit and the upper limit differ by one and a number of digits of at least one of the lower limit and the upper limit exceed a threshold; and
   a module to format and output the code value, symbol counts associated with the code value, and un-encoded reference pixel values in a data stream,
   wherein the prediction module is configured to represent pixel values with multiple-bytes including a most significant byte and a least significant byte, and wherein the prediction module includes: a most significant byte model to estimate most significant byte pixel values from first byte reference pixel values; and a least significant byte model to estimate least significant byte pixel values from least significant byte reference pixel values, and
   wherein:
   the sequence of video frames corresponds to a sequence of infrared images; wherein adjacent ones of the images are substantially similar to one another;
   the prediction module is configured to represent the symbols with multiple-bytes, including a most significant byte and a least significant byte; and
   differences between pixel values of the sequence of infrared images and corresponding pixel values of a reference image are relatively small, the symbols are predominantly relatively small positive and negative values, and the most significant bytes of the symbols are predominantly one of all zeros and all ones.

2. The system of claim 1, wherein the underflow module includes:
   a module to remove a second most significant digit of the lower limit and the upper limit, to shift remaining digits of the lower and upper limits towards the corresponding second most significant digit, and to increment a count k, when the most significant digit of the lower limit and the upper limit differ by one and the number of digits of at least one of the lower and upper limits exceeds the threshold;
   a module to detect when a most significant digit of the lower limit and an upper limit are equal to one another and to output the most significant digit as a next significant digit of the code value; and
   a module to output k zeros as the next k significant bits of the code value when the most significant bit of the lower limit is incremented to equal the most significant digit of the upper limit, and to output k nines as the next k significant bits of the code value when the most significant bit of the upper limit is decremented to equal the most significant digit of the lower limit.

3. The system of claim 1, wherein the prediction module includes: a module to estimate pixel values of a video frame as pixel values of a reference video frame.

4. The system of claim 1, wherein the sequence of video frames include multi-spectral pixel data, and wherein the prediction module includes: a module to estimate pixel values corresponding to one or more of the spectrums from pixel values corresponding to one or more other ones of the spectrums.

5. The system of claim 1, further including: a module to read the code value, the corresponding symbol counts, and the un-encoded pixel values from the data stream; a decoder module to decode the sequence of symbols from the code value read from the data stream; and a corrector module to reconstruct the sequence of video frames from the decoded sequence of symbols and the un-encoded reference pixel values in accordance with the one or more models.

6. The system of claim 5, wherein the corrector module includes:
a module to estimate the pixel values from the un-encoded pixel values in accordance with the one or more models; and
a module to combine the estimated pixel values with the corresponding decoded symbols.

7. The system of claim 5, wherein the decoder module includes:
a module to associate the symbols with portions of a code range in proportion to occurrences of the symbols within the sequence of symbols, as identified by the symbol count read from the data stream;
a module to populate a table with the code ranges associated with the symbols and to order the table in accordance with the proportions; and
a module to search the table in accordance with the ordering of the table to identify a code range that corresponds to the code value, to identify a corresponding symbol, and to arithmetically remove the identified symbol from the code value, iteratively for each of the symbols.

8. A system, comprising:
a module to arithmetically encode a sequence of symbols corresponding to differences between estimated pixel values and corresponding received pixel values of a sequence of video frames as a floating point integer code value, including to associate the symbols with portions of a code range such that each respective one of the symbols is assigned a corresponding consecutive portion of the code range in proportion to a frequency of occurrence of each respective one of the symbols within the sequence of symbols, and to iteratively refine the code range in accordance with the proportions associated with the symbols to define an output code value representing a compressed form of the sequence of symbols;
an underflow a module to reduce a number of digits in one or more of a lower limit and an upper limit of the code range when the most significant digits of the lower limit and the upper limit differ by one and a number of digits of at least one of the lower limit and the upper limit exceed a threshold; and
a prediction module configured to represent pixel values with multiple-bytes including a most significant byte and a least significant byte, and wherein the prediction module includes: a most significant byte model to estimate most significant byte pixel values from first byte reference pixel values; and a least significant byte model to estimate least significant byte pixel values from least significant byte reference pixel values, and
wherein:
the sequence of video frames corresponds to a sequence of infrared images; wherein adjacent ones of the images are substantially similar to one another;
the prediction module is configured to represent the symbols with multiple-bytes, including a most significant byte and a least significant byte; and
differences between pixel values of the sequence of infrared images and corresponding pixel values of a reference image are relatively small, the symbols are predominantly relatively small positive and negative values, and the most significant bytes of the symbols are predominantly one of all zeros and all ones.

9. The system of claim 8, wherein the underflow module includes:
a module to remove a second most significant digit of the lower limit and the upper limit, to shift remaining digits of the lower and upper limits towards the corresponding second most significant digit, and to increment a count k, when the most significant digit of the lower limit and the upper limit differ by one and the number of digits of at least one of the lower and upper limits exceeds the threshold;
a module to detect when a most significant digit of the lower limit and an upper limit are equal to one another and to output the most significant digit as a next significant digit of the code value; and
a module to output k zeros as the next k significant bits of the code value when the most significant bit of the lower limit is incremented to equal the most significant digit of the upper limit, and to output k nines as the next k significant bits of the code value when the most significant bit of the upper limit is decremented to equal the most significant digit of the lower limit.

10. The system of claim 8, further including a decoder module to decode the sequence of symbols from the code value, wherein the decoder module includes:
a module to associate the symbols with portions of a code range in proportion to occurrences of the symbols within the sequence of symbols;
a module to populate a table with the code ranges associated with the symbols, and to order the table in accordance with the proportions; and
a module to search the table in accordance with the ordering of the table to identify a code range that corresponds to the code value, to identify a corresponding symbol, and to arithmetically remove the identified symbol from the code value, iteratively for each of the symbols.

11. A method, comprising:
receiving pixel values associated with a sequence of video frames;
estimating pixel values of at least a portion of the video frames in accordance with one or more models and generating a sequence of symbols corresponding to differences between the estimated pixel values and corresponding received pixel values;
arithmetically encoding a sequence of symbols as a floating point integer code value, including associating the symbols with portions of a code range such that each respective one of the symbols is assigned a corresponding consecutive portion of the code range in proportion to a frequency of occurrence of each respective one of the symbols within the sequence of symbols, and iteratively refining the code range in accordance with the proportions associated with the symbols to define an output code value representing a compressed form of the sequence of symbols;
reducing a number of digits in one or more of a lower limit and an upper limit of the code range when the most significant digits of the lower limit and the upper limit differ by one and a number of digits of at least one of the lower limit and the upper limit exceed a threshold; and
formatting and outputting the code value, symbol counts associated with the code value, and un-encoded reference pixel values, in a data stream;
wherein the receiving, the estimating, the arithmetically encoding, the reducing, and the formatting, are performed in a suitably programmed computer system, and wherein a prediction module is provided that is configured to represent pixel values with multiple-bytes including a most significant byte and a least significant byte, and wherein the prediction module includes: a most significant byte model to estimate most significant byte pixel values from first byte reference pixel values; and a least significant byte model to estimate least significant byte pixel values from least significant byte reference pixel values, and wherein:

the sequence of video frames corresponds to a sequence of infrared images; wherein adjacent ones of the images are substantially similar to one another;

the prediction module is configured to represent the symbols with multiple-bytes, including a most significant byte and a least significant byte; and differences between pixel values of the sequence of infrared images and corresponding pixel values of a reference image are relatively small, the symbols are predominantly relatively small positive and negative values, and the most significant bytes of the symbols are predominantly one of all zeros and all ones.

12. The method of claim 11, wherein the reducing includes:
removing a second most significant digit of the lower limit and the upper limit, shifting remaining digits of the lower and upper limits towards the corresponding second most significant digit, and increment a count k, when the most significant digit of the lower limit and the upper limit differ by one and the number of digits of at least one of the lower and upper limits exceeds the threshold;

detecting when a most significant digit of the lower limit and the upper limit are equal to one another and outputting the most significant digit as a next significant digit of the code value;

outputting k zeros as the next k significant bits of the code value when the most significant bit of the lower limit is incremented to equal the most significant digit of the upper limit; and outputting k nines as the next k significant bits of the code value when the most significant bit of the upper limit is decremented to equal the most significant digit of the lower limit.

13. The method of claim 11, further including:
representing pixel values with multiple-bytes, including a most significant byte and a least significant byte:
estimating most significant byte pixel values from first byte reference pixel values; and
estimating least significant byte pixel values from least significant byte reference pixel values.

14. The method of claim 13, wherein the sequence of video frames corresponds to a sequence of infrared images and adjacent ones of the images are substantially similar to one another, the method further including:
representing the symbols with multiple-bytes, including a most significant byte and a least significant byte;
wherein differences between pixel values of the sequence of infrared images and corresponding pixel values of a reference image are relatively small, the symbols are predominantly relatively small positive and negative values, and the most significant bytes of the pixel difference values are predominantly one of all zeros and all ones.

15. The method claim 11, wherein the estimating includes:
estimating pixel values of a video frame as pixel values of a reference video frame.

16. The method claim 11, wherein the sequence of video frames include multi-spectral pixel data, and wherein the estimating includes: estimating pixel values corresponding to one or more of the spectrums from pixel values corresponding to one or more other ones of the spectrums.

17. The method of claim 11, further including:
reading the code value, the corresponding symbol counts, and the un-encoded pixel values from the data stream;
decoding the sequence of symbols from the code value read from the data stream; and
estimating the pixel values from the un-encoded pixel values in accordance with the one or more models; and
combining the estimated pixel values with the corresponding decoded symbols to reconstruct the sequence of video frames.

18. The method of claim 17, wherein the decoding includes:
associating the symbols with portions of a code range in proportion to occurrences of the symbols within the sequence of symbols, as identified by the symbol count read from the data stream;
populating a table with the code ranges associated with the symbols, and ordering the table in accordance with the proportions; and
searching the table in accordance with the ordering of the table to identify a code range that correspond to the code value, identifying a corresponding symbol, and arithmetically removing the identified symbol from the code value, iteratively for each of the symbols.

* * * * *